(12) United States Patent
Ravala et al.

(10) Patent No.: US 12,346,733 B2
(45) Date of Patent: Jul. 1, 2025

(54) BATCH PROCESSING AND ERROR RESOLUTION MANAGEMENT

(71) Applicant: Capital One Services, LLC, McLean, VA (US)

(72) Inventors: Yasaswy Ravala, Glen Allen, VA (US); Anand Annamalai, Glen Allen, VA (US); Gayatri Vishnubhotla, Plano, TX (US); Krystan R. Franzen, Mechanicsville, VA (US); Kadhiresan Kanniyappan, Ashburn, VA (US); Abel Fletcher, Prosper, TX (US)

(73) Assignee: Capital One Services, LLC, McLean, VA (US)

( * ) Notice: Subject to any disclaimer, the term of this patent is extended or adjusted under 35 U.S.C. 154(b) by 239 days.

(21) Appl. No.: 17/249,320

(22) Filed: Feb. 26, 2021

(65) Prior Publication Data
US 2022/0276901 A1    Sep. 1, 2022

(51) Int. Cl.
| | | |
|---|---|---|
| *G06F 9/50* | (2006.01) | |
| *G06F 8/00* | (2018.01) | |
| *G06F 9/48* | (2006.01) | |
| *G06F 9/54* | (2006.01) | |
| *G06F 11/00* | (2006.01) | |
| *G06Q 10/0631* | (2023.01) | |

(52) U.S. Cl.
CPC ............ *G06F 9/5038* (2013.01); *G06F 8/00* (2013.01); *G06F 9/4843* (2013.01); *G06F 9/4881* (2013.01); *G06F 9/5072* (2013.01); *G06F 9/544* (2013.01); *G06F 11/00* (2013.01); *G06Q 10/0631* (2013.01)

(58) Field of Classification Search
None
See application file for complete search history.

(56) References Cited

U.S. PATENT DOCUMENTS

| | | | | |
|---|---|---|---|---|
| 5,872,970 A | * | 2/1999 | Pickett | G06F 15/161 |
| | | | | 714/E11.202 |
| 7,336,779 B2 | * | 2/2008 | Boyer | H04M 3/51 |
| | | | | 379/265.09 |
| 8,044,782 B2 | * | 10/2011 | Saban | B60N 2/002 |
| | | | | 340/439 |
| 8,549,353 B2 | * | 10/2013 | Thomson | G06F 9/4494 |
| | | | | 714/38.1 |
| 9,232,065 B1 | * | 1/2016 | Gargi | H04L 67/53 |
| 9,881,282 B1 | * | 1/2018 | Narayanaswamy | H04L 67/02 |
| 2006/0075253 A1 | * | 4/2006 | Sonkin | G06Q 10/0631 |
| | | | | 713/184 |
| 2006/0077958 A1 | * | 4/2006 | Mallya | H04M 7/006 |
| | | | | 370/352 |

(Continued)

FOREIGN PATENT DOCUMENTS

JP    2019054388 A    *    4/2019

*Primary Examiner* — Abu Zar Ghaffari
(74) *Attorney, Agent, or Firm* — Harrity & Harrity, LLP

(57) ABSTRACT

In some implementations, a device may cause execution of a batch processing job. The batch processing job may be associated with an application and at least one user. The device may determine that execution of the batch processing job is associated with one or more execution errors. The device may determine, based on the one or more execution errors, an error remediation action for the batch processing job. The device may cause performance of the error remediation action for the batch processing job.

20 Claims, 9 Drawing Sheets

(56) References Cited

U.S. PATENT DOCUMENTS

| | | | |
|---|---|---|---|
| 2006/0184944 A1* | 8/2006 | Schwerk | G06F 9/4881 718/101 |
| 2007/0214381 A1* | 9/2007 | Goyal | G06F 11/1482 714/5.1 |
| 2008/0255919 A1* | 10/2008 | Gorder | G06Q 10/109 705/7.13 |
| 2009/0265710 A1* | 10/2009 | Shen | G06F 11/2038 718/101 |
| 2010/0162364 A1* | 6/2010 | Roth | H04L 63/105 726/4 |
| 2010/0318859 A1* | 12/2010 | Augusto | G06F 11/0715 714/57 |
| 2010/0324963 A1* | 12/2010 | Gupta | G06Q 10/107 709/204 |
| 2011/0161946 A1* | 6/2011 | Thomson | G06Q 10/10 717/155 |
| 2012/0150528 A1* | 6/2012 | Upadhyaya | G06F 9/4843 718/101 |
| 2014/0135053 A1* | 5/2014 | Brewer | H04W 76/45 455/519 |
| 2014/0149987 A1* | 5/2014 | Barillari | G06F 9/4843 718/101 |
| 2014/0245179 A1* | 8/2014 | Raghavan | H04L 65/403 715/753 |
| 2015/0089505 A1* | 3/2015 | Malaiyandisamy | G06F 9/5072 718/101 |
| 2015/0113316 A1* | 4/2015 | Lefrancois des Courtis | H04L 67/55 714/4.11 |
| 2015/0277976 A1* | 10/2015 | De | G06F 9/4843 718/101 |
| 2015/0304451 A1* | 10/2015 | Banks | H04L 67/60 709/201 |
| 2016/0098293 A1* | 4/2016 | Schmidt | G06F 9/485 718/101 |
| 2017/0102989 A1* | 4/2017 | Kotikalapudi | H04L 67/34 |
| 2017/0111459 A1* | 4/2017 | Fisher | H04L 12/6418 |
| 2017/0139752 A1* | 5/2017 | Jamjoom | G06F 9/4881 |
| 2017/0242733 A1* | 8/2017 | Qi | G06F 9/44 |
| 2017/0286207 A1* | 10/2017 | Campbell | G06F 11/0772 |
| 2018/0152486 A1* | 5/2018 | Singh | G06Q 10/10 |
| 2019/0166011 A1* | 5/2019 | Cordray | H04L 67/1001 |
| 2020/0012520 A1* | 1/2020 | Bidkar | G06F 9/3838 |
| 2020/0327008 A1* | 10/2020 | Singh | G06F 9/451 |
| 2021/0176204 A1* | 6/2021 | Geppert | G06F 3/04842 |

* cited by examiner

BATCH PROCESSING AND ERROR RESOLUTION MANAGEMENT

BACKGROUND

Batch processing may be employed to run processing jobs that are high-volume and/or repetitive. For example, users may collect and store data, which is then processed during an event referred to as a "batch window." Batch processing improves efficiency by processing jobs when computing resources are available, and with little or no human interaction.

SUMMARY

In some implementations, a system for batch processing includes one or more memories and one or more processors, communicatively coupled to the one or more memories, configured to identify a plurality of batch processing jobs that are to be executed, where the plurality of batch processing jobs are associated with a plurality of applications and a plurality of users; cause execution of a batch processing job of the plurality of batch processing jobs, where the batch processing job is associated with an application, of the plurality of applications, and at least one user of the plurality of users; determine that execution of the batch processing job is associated with one or more execution errors; transmit, to a mobile device of the at least one user associated with the batch processing job and based on determining that execution of the batch processing job is associated with the one or more execution errors, a notification that includes a prompt for generating a support request for the batch processing job; receive, from the mobile device, an instruction to generate the support request for the batch processing job based on activation of the prompt; and generate, based on the instruction, the support request for the batch processing job.

In some implementations, a method for batch processing includes identifying a plurality of batch processing jobs that are to be executed, where the plurality of batch processing jobs are associated with a plurality of applications and a plurality of users; causing execution of a batch processing job of the plurality of batch processing jobs, where the batch processing job is associated with an application, of the plurality of applications, and at least one user of the plurality of users; determining that execution of the batch processing job is associated with one or more execution errors; determining, based on the one or more execution errors, an error remediation action for the batch processing job; and transmitting, to a mobile device of the at least one user associated with the batch processing job, a notification that includes a prompt for initiating the error remediation action for the batch processing job.

In some implementations, a non-transitory computer-readable medium storing a set of instructions includes one or more instructions that, when executed by one or more processors of a device, cause the device to cause execution of a batch processing job, where the batch processing job is associated with an application and at least one user; determine that execution of the batch processing job is associated with one or more execution errors; determine, based on the one or more execution errors, an error remediation action for the batch processing job; and cause performance of the error remediation action for the batch processing job.

DETAILED DESCRIPTION

Figure 1A:
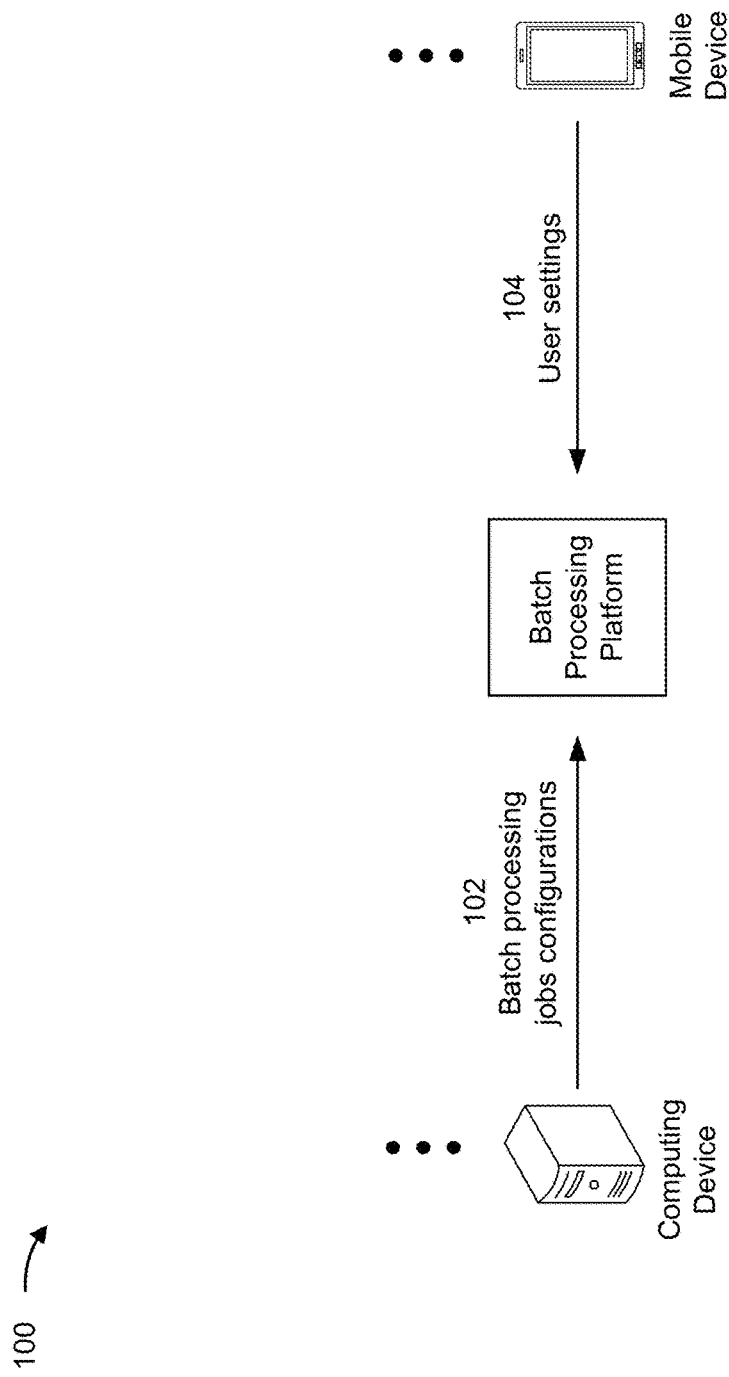
FIG. 1A is a diagram of a portion of an example implementation relating to batch processing management.

The following detailed description of example implementations refers to the accompanying drawings. The same reference numbers in different drawings may identify the same or similar elements.

Large organizations, such as financial institutions, may execute hundreds or thousands of batch processing jobs per day. The batch processing jobs may consume a significant amount of scheduled and on-demand computing time and resources. Moreover, many of the batch processing jobs may be critical to the operation of the organization. Often, the batch processing jobs are associated with numerous different users and/or a variety of different applications or computing environments. In addition, many batch processing jobs may be dependent on successful execution of other batch processing jobs. As a result, management of the batch processing of an organization is complex, and tracking of batch processing jobs across applications and/or users may be difficult.

At times, a batch processing job may fail to execute, fail to execute properly, fail to execute within an allotted time, or the like. In such cases, immediate remedial actions may be needed, particularly if the batch processing job is mission critical. In some cases, after identifying an error for a batch processing job, a user may open a support ticket for resolution of the error. However, organizations may lack capabilities to efficiently locate and access information relating to the error, the batch processing job, an application associated with the batch processing job, and/or a user associated with the batch processing job, thereby delaying resolution of the error. Moreover, many errors are addressed manually using a traditional runbook or by a scripted integration with the application (e.g., the desktop application) associated with the batch processing job, thereby further delaying resolution of the error.

To solve the problems described above, as well as a related technical problem associated with tracking and coordinating batch processing jobs across numerous applications and/or users, a technical solution is described herein for managing batch processing jobs. In some implementations, a centralized batch processing platform may be used for management of batch processing jobs. The batch processing platform may be configured to communicate with various different applications associated with batch processing jobs. For example, the batch processing platform may be configured to communicate with the different applications via respective application programming interfaces (APIs). Moreover, the batch processing platform may be configured to communicate with the different applications in order to configure batch processing jobs, execute batch processing jobs, and/or receive error messages relating to batch processing jobs, among other examples.

In some implementations, the batch processing platform may perform error remediation operations for batch processing jobs. For example, the batch processing platform may determine an error associated with a batch processing job, and the batch processing platform may transmit a notification to mobile devices of one or more users associated with the batch processing job. The notification may provide one or more prompts for initiating error remediation actions for the batch processing job, such as automatically generating a support request and/or automatically executing one or more operations of a runbook, among other examples. In some implementations, the batch processing platform may automatically perform one or more error remediation actions without user input. The batch processing platform also may be configured to communicate (e.g., via respective APIs) with various different applications, such as a support request application and/or a user paging application, in connection with the error remediation operations.

In this way, the batch processing platform provides centralized management of batch processing jobs and error remediation, thereby improving the efficiency of the batch processing and the efficiency of computing resource utilization. Moreover, the batch processing platform improves the speed of error remediation, which minimizes downtime and disruptions to a stream of batch processing jobs. Thus, the batch processing platform conserves computing resources that may otherwise be used for prolonged error remediation or for remediation of downstream job failures caused by an upstream job failure that was not quickly resolved. In addition, as described above, many batch processing jobs are mission critical, and therefore fast error remediation improves the operations and functions of the organization associated with the batch processing jobs.

FIGS. 1A-1F are diagrams of an example 100 associated with batch processing management. As shown in FIGS. 1A-1F, example 100 includes a batch processing platform, one or more computing devices, and one or more mobile devices. These devices are described in more detail in connection with FIGS. 2 and 3. The batch processing platform may be associated with an organization such as a financial institution. As described below, the batch processing platform may provide centralized management of the batch processing jobs of the organization. The computing device(s) also may be associated with the organization. As described below, the computing device(s) may be configured to execute one or more applications associated with the batch processing jobs of the organization.

The batch processing platform may be configured to communicate with multiple different applications in connection with executing batch processing jobs and/or in connection with receiving error messages for batch processing jobs, as described below. For example, each application may use a respective API (e.g., associated with a respective set of commands), and the batch processing platform may be configured to communicate via multiple different APIs of the multiple different applications. As an example, the batch processing platform may communicate with a first application via a first API, communicate with a second application via a second API, and so forth. A configuration for communicating with an application (which may be referred to herein as a "communication configuration") may identify a computing device and/or a computing environment associated with the application, an API gateway associated with the application, and/or a set of API commands associated with the application, among other examples.

In some implementations, the batch processing platform may be configured to communicate with multiple different applications (e.g., using respective APIs, as described above) in connection with performance of an error remediation action, as described below. Here, the applications may be different from the applications used to execute batch processing jobs described above. For example, the applications may include an application for management of support requests, an application for management of users and/or paging users, and/or an application for group communication (e.g., conference calling), among other examples.

The mobile device(s) may be associated with users that are associated with the batch processing jobs. For example, a user may have configured or requested a particular batch processing job, or may otherwise be affiliated with the batch processing job (e.g., because the user and the batch processing job are associated with the same department, operation, or function of the organization). A mobile device may be configured to execute an application (e.g., a mobile application) that facilitates communication between the batch processing platform and the mobile device. In some implementations, one or more operations described herein as being performed by a mobile device may be performed by another type of user device, such as a desktop computer.

As shown in FIG. 1A, and by reference number 102, the batch processing platform may obtain configurations for batch processing jobs from one or more computing devices. A batch processing job configuration may identify a set (e.g., one or more) of users associated with a job, and a set of parameters for a job, such as one or more applications that are to be used to perform a job, one or more other jobs on which a job depends (also referred to as "upstream dependencies"), one or more other jobs that depend on a job (also referred to as "downstream dependencies"), a location or identifier of data that is to be used as input for a job, a location or identifier for data that is generated as output of a job, a time schedule for a job, a time allotment for a job, and/or a priority level associated with a job, among other examples. The users associated with a batch processing job may be associated with a priority order (e.g., that identifies a primary user for the job, a secondary user for the job, and so forth), associated with respective authorization levels, and/or associated with respective roles (e.g., team leader, team member, or the like), among other examples. These associations may be indicated in the batch processing job configuration or a separate user configuration (e.g., obtained from an application for user management). In this way, the batch processing platform may provide centralized management of batch processing jobs that are to be executed across different applications and for different users.

In some implementations, the batch processing platform may obtain a batch processing job configuration from an application executing on a computing device. For example, the batch processing platform may obtain the configuration for a batch processing job from the application associated with the batch processing job (e.g., via an API of the application). Accordingly, in some implementations, the application may provide the configuration in response to a request for the configuration made by the batch processing platform. In some implementations, a batch processing job configuration may be manually entered to the batch processing platform by an operator. In some implementations, the batch processing platform may obtain a batch processing job configuration from a mobile device.

As shown by reference number 104, the batch processing platform may obtain user settings from one or more mobile devices. That is, a mobile device may provide a set of user settings that are unique to a user of the mobile device. A set of user settings for a user may identify one or more batch processing jobs flagged by the user (e.g., a list of favorites), a time window during which the user is to receive notifications and/or during which the user is generally available to address batch processing execution errors, one or more error remediation actions selected by the user for automatic performance, and/or one or more runbooks selected by the user for error remediation, among other examples. In some implementations, the user settings for a user may be periodically updated. In this way, the batch processing platform may provide centralized management of user settings, and in particular error remediation settings, for batch processing.

Figure 1B:
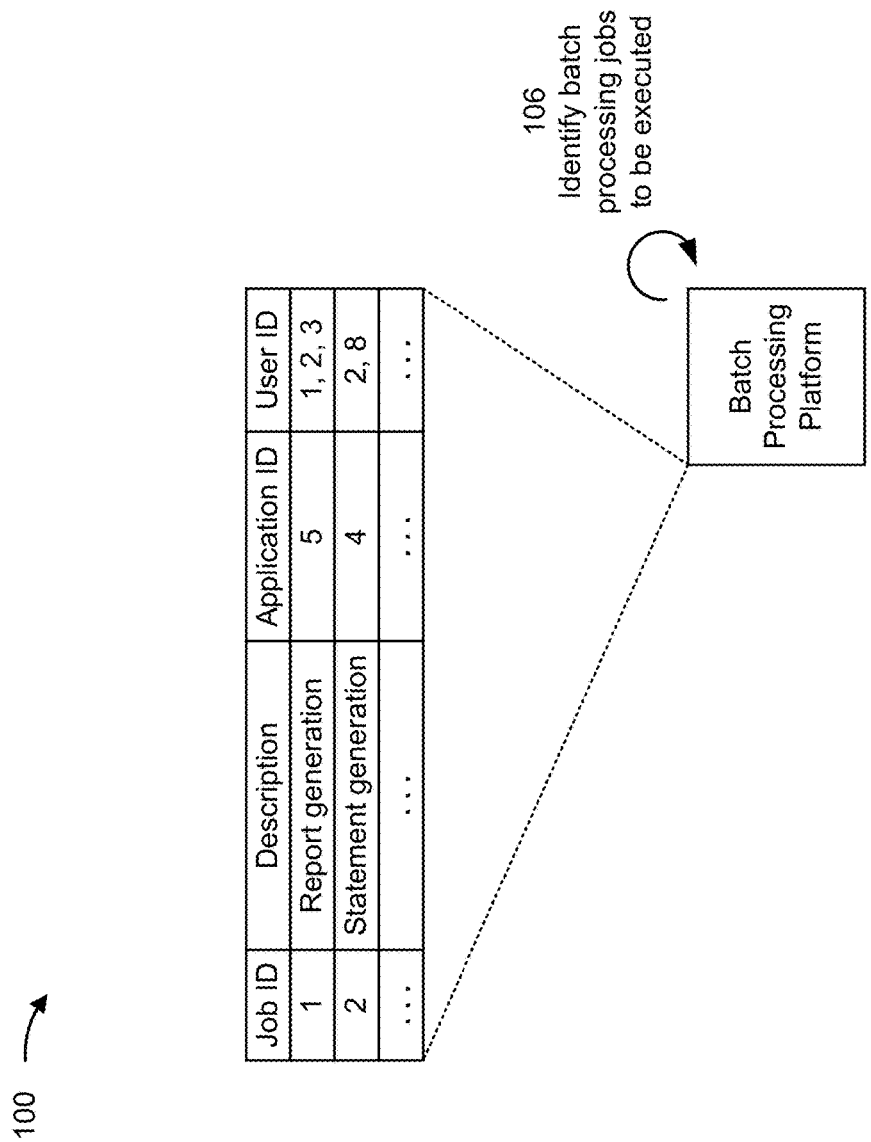
FIG. 1B is a diagram of a portion of an example implementation relating to batch processing management and an example batch processing job identification technique related thereto.

As shown in FIG. 1B, and by reference number 106, the batch processing platform may identify one or more batch processing jobs that are to be executed. For example, the batch processing platform (e.g., using a scheduling component) may determine one or more batch processing jobs that are scheduled to be performed and/or one or more batch processing jobs associated with a request for on-demand execution. The batch processing jobs may include one or more jobs for generating reports, one or more jobs for performing regulatory filings, one or more jobs for settling monetary inflows and outflows, one or more jobs for check clearing, one or more jobs for generating account statements, and/or one or more jobs for moving files to a data lake, among other examples.

In some implementations, the batch processing platform may identify a plurality of batch processing jobs that are associated with a plurality of applications and/or a plurality of users. For example, as shown in FIG. 1B, batch processing jobs identified by the batch processing platform may be different types of jobs, jobs associated with different applications, and/or jobs associated with different sets of users.

In some implementations, the batch processing platform may identify the batch processing jobs that are to be executed based at least in part on determining an availability of computing resources for a job, determining that a time scheduling condition for a job is satisfied, and/or determining that a time allotment for a job satisfies an available amount of computing time, among other examples. In some implementations, the batch processing platform may identify the batch processing jobs that are to be executed based at least in part on receiving a request for on-demand execution of a batch processing job (e.g., from a mobile device). In some implementations, the batch processing platform may identify the batch processing jobs that are to be executed based at least in part on a priority level assigned to a batch processing job. In some implementations, the batch processing platform may identify the batch processing jobs that are to be executed based at least in part on one or more upstream dependencies or downstream dependencies associated with a batch processing job (e.g., the batch processing platform may determine that an upstream dependency is to be executed before a downstream dependency).

Figure 1C:
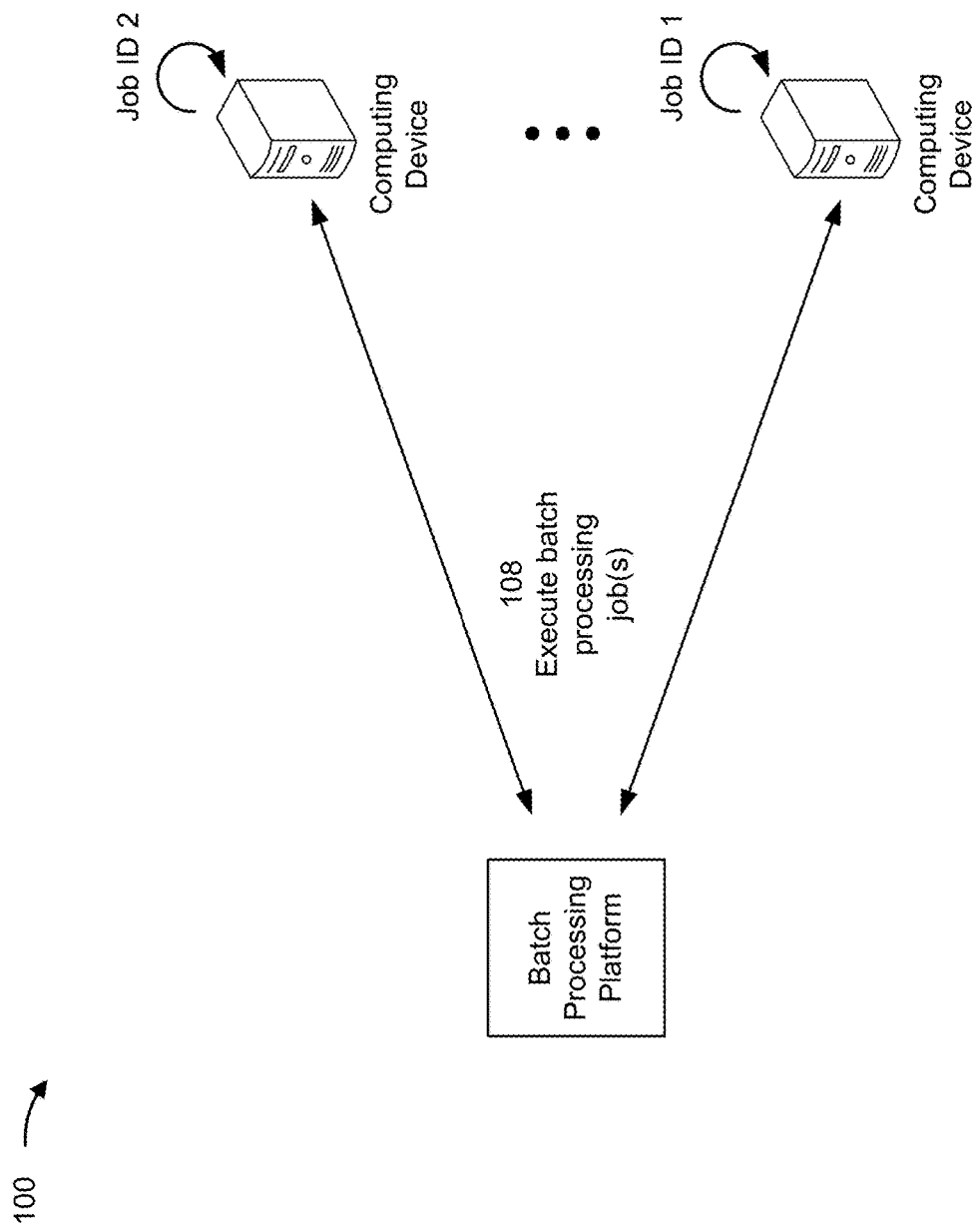
FIG. 1C is a diagram of a portion of an example implementation relating to batch processing management and an example batch processing job execution technique related thereto.

As shown in FIG. 1C, and by reference number 108, the batch processing platform may execute one or more batch processing jobs (e.g., execute the batch processing jobs identified by the batch processing platform). For example, the batch processing platform may cause execution of different batch processing jobs at different computing devices and/or by different applications (e.g., each application may execute on a respective computing device or multiple applications may execute on the same computing device).

When executing a batch processing job, the batch processing platform may determine (e.g., according to a batch processing job configuration) an application associated with a batch processing job. The batch processing platform may determine (e.g., according to a communication configuration for the application) a computing device and/or a set of commands for executing the batch processing job that are associated with the application (e.g., which may be different from a computing device and/or a set of commands associated with a different application). The batch processing platform may provide a command (e.g., to the computing device) that causes execution of the batch processing job by the application. The batch processing platform may provide the command via an API of the application. For example, the batch processing platform may command (e.g., using the set of commands determined by the batch processing platform) one or more operations of the application, via the API, in order to cause execution of the batch processing job. In some examples, the batch processing platform may cause execution of a first batch processing job, via a first API of a first application, using a first set of commands, and the batch processing platform may cause execution of a second batch processing job, via a second API of a second application, using a second set of commands.

Figure 1D:
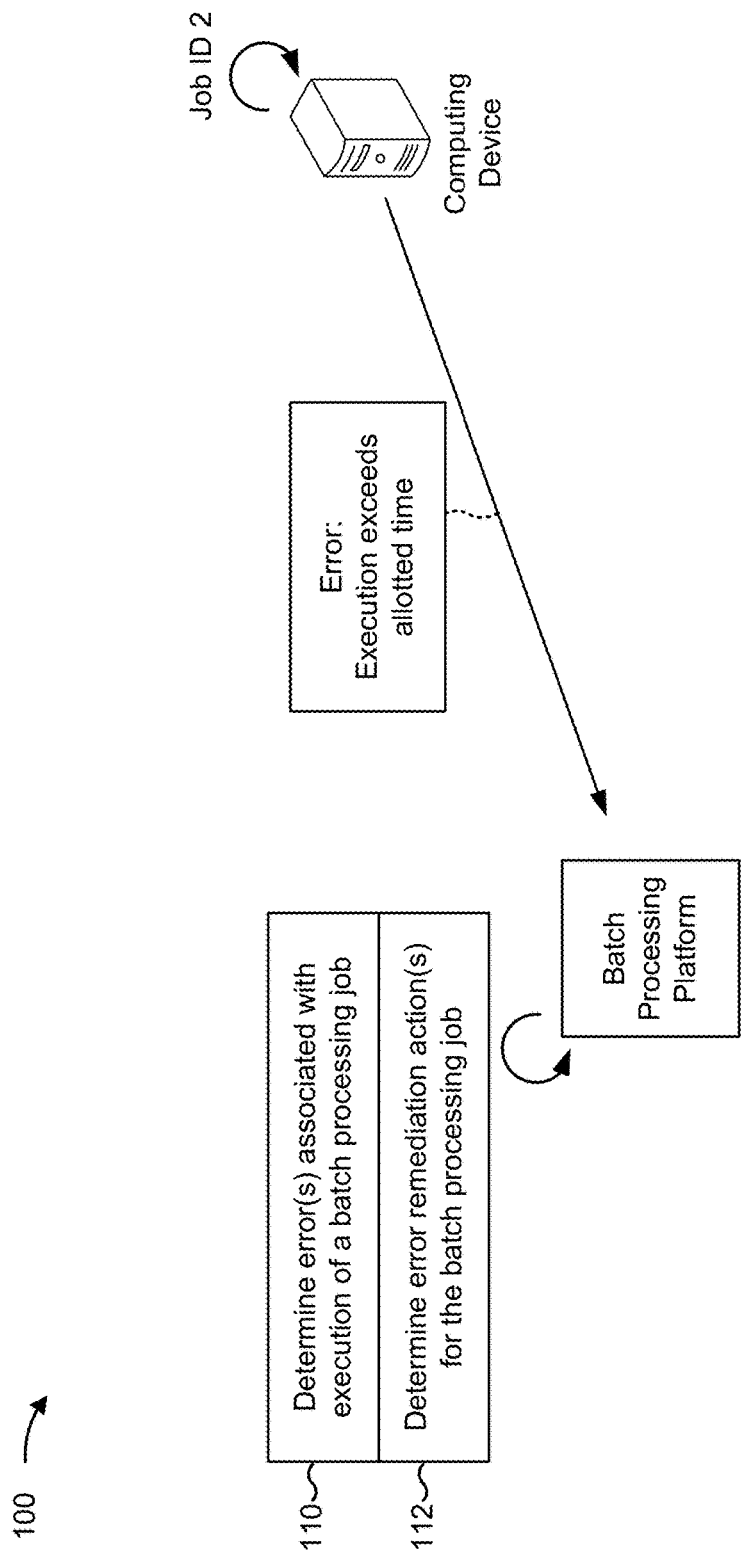
FIG. 1D is a diagram of a portion of an example implementation relating to batch processing management and an example batch processing job error determination technique related thereto.

As shown in FIG. 1D, and by reference number 110, the batch processing platform may determine one or more errors associated with execution of a batch processing job. An error for a batch processing job may include an error caused by the job failing to execute, an error caused by an operation, upon which the job depends (e.g., retrieval of information from a database), failing to execute, an error caused by another job, upon which the job depends, failing to execute, an error in performing one or more operations of the job, an error in generating an output of the job, an error caused by execution of the job beginning later than a scheduled start time for the job, an error caused by execution of the job continuing past a scheduled end time for the job, and/or an error caused by the job exceeding a time allotment for the job, among other examples. A failure to execute may include a failure to initiate or a failure to perform all operations associated with an execution.

In some implementations, the batch processing platform may determine an error for a batch processing job based on a configuration for the batch processing job. For example, the batch processing platform may determine that the job has not completed by an end time scheduled for the job, determine that the job has not completed within a time allotment for the job, determine that the job is dependent upon another job associated with an error, or the like. In some implementations, the batch processing platform may determine an error for a batch processing job based on receiving a message (e.g., from a computing device executing an application associated with the batch processing job) that identifies one or more errors associated with the execution of the batch processing job. The batch processing platform may receive the message via an API of the application. In some examples, the batch processing platform may receive an error message for a first batch processing job via a first API of a first application, and the batch processing platform may receive an error message for a second batch processing job via a second API of a second application.

As shown by reference number 112, the batch processing platform may determine one or more error remediation actions for the batch processing job associated with the error(s). An error remediation action may include generating a support request, executing one or more operations of a runbook, generating a group communication session (e.g., a conference call), terminating a batch processing job, re-executing a batch processing job, and/or executing a different batch processing job, among other examples.

The batch processing platform may determine an error remediation action based on one or more rules, one or more user settings, a type of an error, a time at which an error occurs, a priority level (e.g., a criticality) assigned to a batch processing job associated with an error, and/or an availability of computing resources, among other examples. Thus, error remediation actions determined by the batch processing platform may be different for different errors and/or for different batch processing jobs. For example, the batch processing platform may determine to terminate a low priority batch processing job that failed while available computing resources are low. As another example, the batch processing platform may determine to execute operations of a runbook and generate a group communication session for a high priority batch processing job that failed.

Figure 1E:
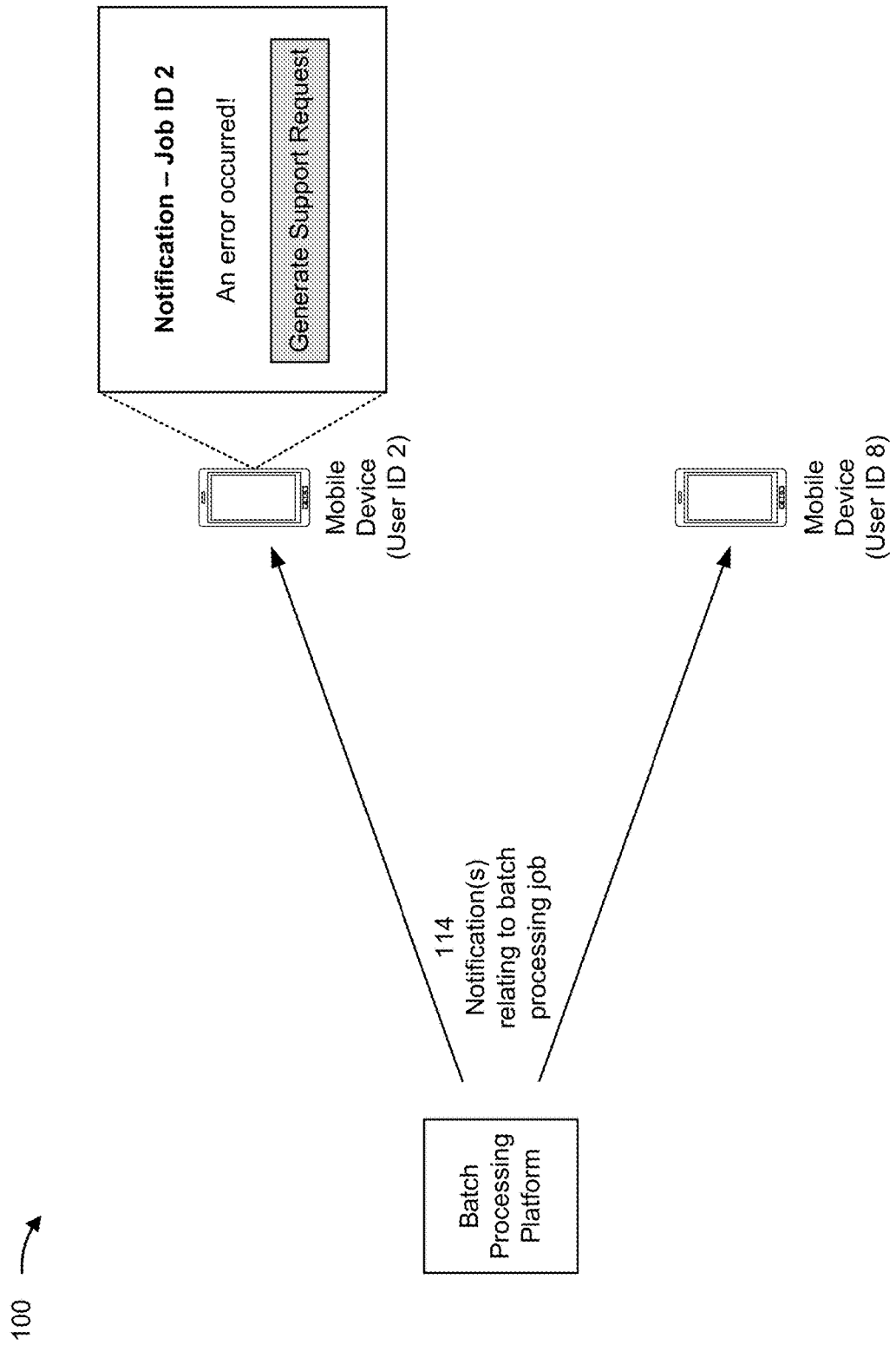
FIG. 1E is a diagram of a portion of an example implementation relating to batch processing management and an example notification technique related thereto.

As shown in FIG. 1E, and by reference number 114, the batch processing platform may transmit one or more notifications relating to the batch processing job associated with the error(s). For example, the batch processing platform may determine one or more users associated with the batch processing job, and the batch processing platform may transmit a respective notification to the mobile device(s) of the user(s). Notifications sent to different mobile devices of different users may include the same content or different content (e.g., based on a priority order of the users, authorization levels of the users, and/or roles assigned to the users, among other examples).

In some implementations, a notification may identify the error(s) associated with the batch processing job (e.g., a type of an error, a time of an error, and/or a cause of an error, among other examples). Additionally, or alternatively, a notification may identify one or more users associated with the batch processing job, one or more upstream dependencies of the batch processing job, one or more users associated with the upstream dependencies, one or more downstream dependencies of the batch processing job, one or more users associated with the downstream dependencies, and/or contact information for one or more of the aforementioned users, among other examples.

In some implementations, a notification may include one or more prompts for performing one or more error remediation actions. For example, the notification may include a prompt for one or more of the error remediation actions determined by the batch processing platform. As an example, the notification may include a prompt for generating a support request for the batch processing job, a prompt for performing operations of a runbook associated with the batch processing job, a prompt for generating a group communication session, and so forth. A prompt, when activated by a user of a mobile device, may cause transmission (e.g., to the batch processing platform) of an instruction to perform the associated error remediation action.

In some implementations, the batch processing platform may determine which mobile devices are to receive a notification. For example, the batch processing job may be associated with a plurality of users, and the batch processing platform may determine one or more of the plurality of users that are to receive a notification. In some implementations, the batch processing platform may determine that a primary user (e.g., according to a priority order of the users) associated with the batch processing job is to receive a notification. For example, the batch processing platform may determine that the primary user is to receive the notification if the primary user is available, as described in more detail below. In such a case, the batch processing platform may determine that one or more secondary users (e.g., according to the priority order) are not to receive a notification (e.g., to avoid multiple users providing conflicting error remediation instructions).

In some implementations, the batch processing platform may determine the users that are to receive a notification based on location data obtained from the users' mobile devices. For example, the batch processing platform, based on the location data, may determine that a user is in a different location from an established location (e.g., a most-common location or a registered location) of the user (e.g., thereby indicating that the user may be unavailable). In some implementations, the established location and the different location may be at a level of a city, a county, a state, a time zone, a country, or the like. Additionally, or alternatively, the different location may be a location that is a threshold distance from the established location. The batch processing platform may determine to transmit a notification to the mobile device of a user that is in an established location, and/or the batch processing platform may determine to refrain from transmitting a notification to the mobile device of a user that is in a different location. In an example, the batch processing platform may determine that the primary user is in a different location from an established location of the primary user, and the batch processing platform may determine to transmit a notification to the mobile device of a secondary user based on determining that the primary user is in the different location (e.g., and based on determining that the secondary user is in an established location).

In some implementations, the batch processing platform may determine the users that are to receive a notification based on respective current local times associated with the users. For example, the batch processing platform may determine that a current local time associated with a user is outside of a notification time window (e.g., a notification time window associated with the batch processing job and/or associated with the user). This may indicate that the user is not available. The batch processing platform may determine to transmit a notification to the mobile device of a user that is associated with a current local time within a notification time window (e.g., the current local time for the user is 11 am, and the notification time window is from 9 am to 5 pm), and/or the batch processing platform may determine to refrain from transmitting a notification to the mobile device of a user that is associated with a current local time outside of a notification time window (e.g., the current local time for the user is 10 pm and the notification time window is from 9 am to 5 pm). In an example, the batch processing platform may determine that the primary user is associated with a current local time that is outside of a notification time window for the primary user, and the batch processing platform may determine to transmit a notification to the mobile device of a secondary user based on determining that the primary user's current local time is outside of the notification time window (e.g., and based on determining that the secondary user's current local time is within a notification time window).

Figure 1F:
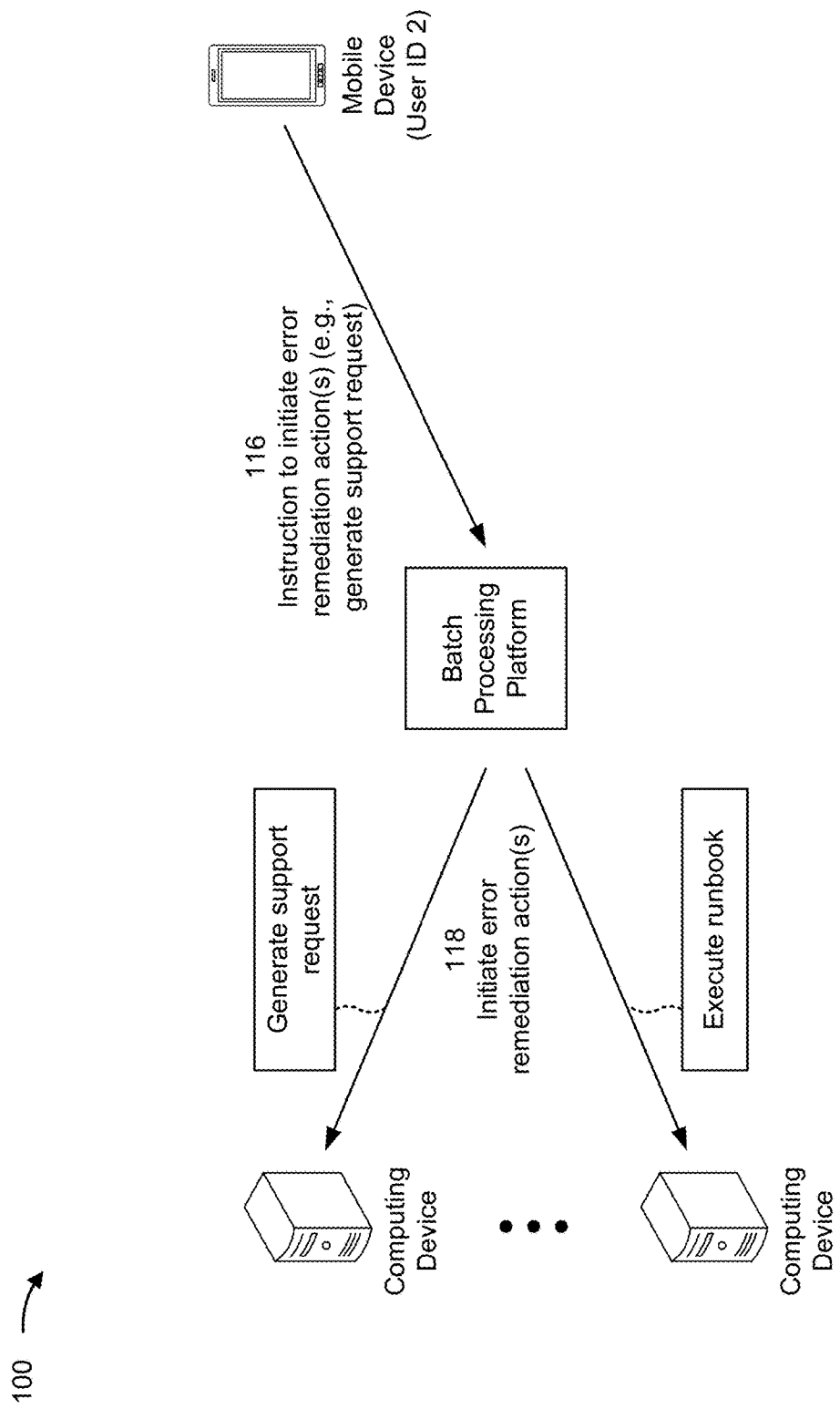
FIG. 1F is a diagram of a portion of an example implementation relating to batch processing management and an example remediation action technique related thereto.

As shown in FIG. 1F, and by reference number 116, the batch processing platform may receive, from a user's mobile device, an instruction to initiate one or more error remediation actions for the batch processing job. That is, the batch processing platform may receive the instruction based on activation of a prompt (e.g., by clicking of the prompt, tapping of the prompt, or the like) by the user of the mobile device. The instruction may identify the batch processing job associated with the error(s), an application associated with the batch processing job, one or more error remediation actions, one or more upstream or downstream dependencies, and/or the user providing the instruction. For example, the instruction may indicate that a support request is to be generated for the batch processing job. As another example, the instruction may indicate that one or more operations of a runbook are to be executed for the batch processing job.

In some implementations, the instruction may be designated for a set of batch processing jobs. For example, the mobile device may transmit a single instruction that is applicable to multiple batch processing jobs (e.g., based on an association between the multiple batch processing jobs that is configured by the user or identified by the batch processing platform). As an example, the instruction for the batch processing job may also be designated for one or more downstream batch processing jobs of the batch processing job.

In some implementations, the batch processing platform may verify the instruction received from the mobile device. For example, the batch processing platform may determine whether the user has authorization (e.g., according to an authorization level or a role associated with the user) to instruct the error remediation action and/or whether the instruction is timely (e.g., whether the instruction was received in a time window for resolving an error). The batch processing platform may reject the instruction if the instruction is not verified. In some implementations, the batch processing platform may receive multiple instructions (e.g., from multiple users) for the batch processing job. Here, the batch processing platform may determine whether the multiple instructions include conflicting instructions, and the batch processing platform may determine to reject one or more of the conflicting instructions. For example, the batch processing platform may determine to reject an instruction according to one or more rules. As an example, the one or more rules may indicate that an instruction received earlier in time is to be followed and an instruction received later in time is to be rejected, that an instruction associated with a higher-priority user is to be followed (e.g., according to a priority order) and an instruction associated with a lower-priority user is to be rejected, or the like.

As shown by reference number 118, the batch processing platform may initiate one or more error remediation actions based on the instruction from the mobile device. When initiating an error remediation action, the batch processing platform may determine (e.g., according to a batch processing job configuration) an application associated with the error remediation action. The batch processing platform may determine (e.g., according to a communication configuration for the application) a computing device and/or a set of commands for initiating the error remediation action that are associated with the application (e.g., which may be different from a computing device and/or a set of commands associated with a different application). The batch processing platform may provide a command (e.g., to the computing device) that causes initiation of the error remediation action. The batch processing platform may provide the command via an API of the application. For example, the batch processing platform may command (e.g., using the set of commands determined by the batch processing platform) one or more operations of the application, via the API, in order to cause initiation of the error remediation action.

In some implementations, the application used by the batch processing platform to initiate the error remediation action may be associated with the batch processing job. In other words, the application may be the same application that was used by the batch processing platform to execute the batch processing job. In some implementations, the application used by the batch processing platform to initiate the error remediation action may be a different application from the application associated with the batch processing job. For example, the different application may be for management of support requests (e.g., a support ticket application), group communication, or the like. Accordingly, the batch processing platform may be configured to communicate with the different application via an API of the different application and using a set of commands particular to the different application.

In some implementations, the batch processing platform may generate a support request as an error remediation action. For example, the batch processing platform may configure a support request via an API of an application for management of support requests. The support request may identify the batch processing job, the error(s), an application associated with the batch processing job, a computing device associated with the batch processing job, one or more users associated with the batch processing job, one or more upstream dependencies of the batch processing job, and/or one or more downstream dependencies of the batch processing job, among other examples.

In some implementations, the batch processing platform may generate a group communication session as an error remediation action. The group communication session may be a telephone conference call, a video conference call, a group chat, or the like. The batch processing platform may configure a group communication session via an API of an application for group communication.

The group communication session may be for multiple users associated with the batch processing job. In some implementations, the group communication session may be for multiple users associated with another batch processing job that is dependent upon the batch processing job. In some implementations, the group communication session may be for one or more users associated with the batch processing job and one or more users associated with a downstream batch processing job. In some implementations, the batch processing platform may determine the users for the group communication session based on an availability of the users (e.g., according to locations and/or current local times associated with the users), in a similar manner as described above in connection with notifications.

In some implementations, the batch processing platform may transmit information relating to the group communication session (e.g., a link to access the group communication session) to the mobile devices of the multiple users. In some implementations, the batch processing platform may cause the mobile devices of the multiple users to connect to the group communication session. For example, the batch processing platform may cause the mobile devices to launch a group communication application that provides the group communication session.

In some implementations, the batch processing platform may automatically (e.g., without an instruction from a mobile device) initiate one or more error remediation actions. For example, the batch processing platform may automatically initiate an error remediation action based on a determination that all users associated with the batch processing job are unavailable (e.g., according to locations and/or current local times associated with the users, as described above). As another example, the batch processing platform may automatically initiate an error remediation action based on a determination that the batch processing job is associated with a priority level that satisfies a threshold priority level (e.g., the batch processing job is high priority/mission critical). In some implementations, the batch processing platform may automatically initiate one or more error remediation actions while also transmitting a notification to a mobile device that includes a prompt for initiating one or more other error remediation actions (e.g., error remediation may use a combination of automatic initiation and manual initiation).

The one or more error remediation actions initiated by the batch processing platform may resolve, or enable faster resolution of, the error(s) associated with the batch processing job. Accordingly, the batch processing platform improves the speed of error remediation, which minimizes batch processing downtime and disruptions. Thus, the batch processing platform conserves computing resources that may otherwise be used for prolonged error remediation or for remediation of downstream job failures caused by an upstream job failure that was not quickly resolved. Further improvements to error remediation speed are achieved through mobile notifications, which are more likely to be received by a user relative to desktop notifications.

As indicated above, FIGS. 1A-1F are provided as an example. Other examples may differ from what is described with regard to FIGS. 1A-1F.

Figure 2:
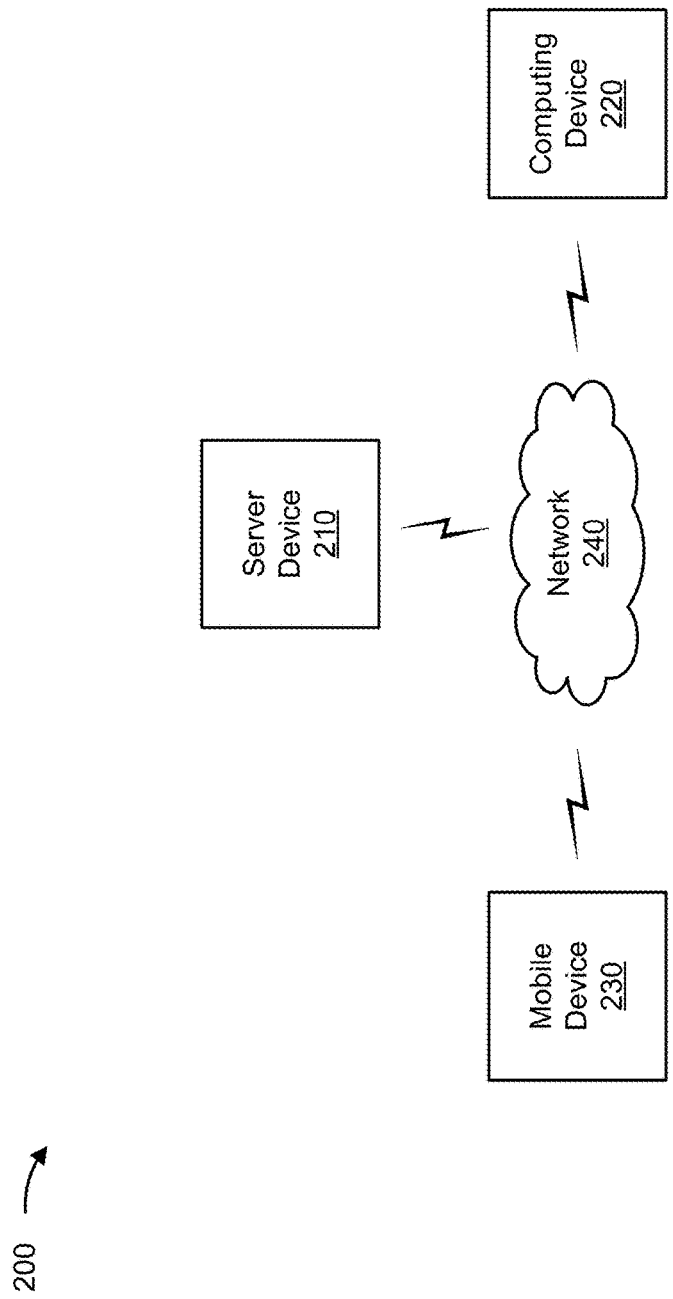
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a server device 210, a computing device 220, a mobile device 230, and a network 240. Devices of environment 200 may interconnect via wired connections, wireless connections, or a combination of wired and wireless connections.

The server device 210 includes one or more devices capable of receiving, generating, storing, processing, providing, and/or routing information associated with batch processing management, as described elsewhere herein. The server device 210 may include a communication device and/or a computing device. For example, the server device 210 may include a server, such as an application server, a client server, a web server, a database server, a host server, a proxy server, a virtual server (e.g., executing on computing hardware), or a server in a cloud computing system. In some implementations, the server device 210 includes computing hardware used in a cloud computing environment.

The server device 210 may implement the batch processing platform, as described elsewhere herein. For example, the server device 210 may implement one or more components of the batch processing platform, such as a scheduling component (e.g., for scheduling a job, executing an on-demand job, executing a scheduled job, generating a report associated with execution of a job, changing a configuration for a job, creating a notification relating to a job, and/or executing a notification relating to a job), a notification component (e.g., for transmitting notifications and/or receiving instructions), a change management component (e.g., for processing a new batch processing job configuration and/or updating an existing batch processing job configuration), and/or an API component (e.g., for communicating with an application, user authorization and authentication, verification of a request to change a configuration for a batch processing job, providing mobile device ingress to the scheduling component, rate limiting of requests, audit logging, access control, and/or request logging).

The computing device 220 includes one or more devices capable of receiving, generating, storing, processing, and/or providing information associated with batch processing, as described elsewhere herein. For example, the computing device 220 may execute an application associated with a batch processing job, may execute a batch processing job using the application, may report an error associated with a batch processing job to the server device 210, or the like. The computing device 220 may include a wireless communication device, a mobile phone, a user equipment, a laptop computer, a tablet computer, a desktop computer, or a similar type of device.

The mobile device 230 includes one or more devices capable of receiving, generating, storing, processing, and/or providing information associated with batch processing management, as described elsewhere herein. The mobile device 230 may include a communication device and/or a computing device. For example, the mobile device 230 may include a wireless communication device, a mobile phone, a user equipment, a laptop computer, a tablet computer, or a wearable communication device (e.g., a smart wristwatch, a pair of smart eyeglasses, a head mounted display, or a virtual reality headset), or a similar type of device.

The mobile device 230 may implement an application that facilitates communication, for batch processing management, with the batch processing platform of the server device 210. The mobile device 230 may implement one or more components of the application, such as a notification component (e.g., for receiving notifications), a flagging component (e.g., for favoriting jobs and/or viewing favorited jobs), a viewing component (e.g., for viewing information relating to job executions), a requesting component (e.g., for requesting on-demand execution of a job), a remediation component (e.g., for transmitting an instruction for an error remediation action and/or performing an error remediation action), a dependency component (e.g., for viewing upstream and/or downstream dependencies associated with a job), and/or a searching component (e.g., for searching for batch processing jobs by name, execution time, error code, and/or user).

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
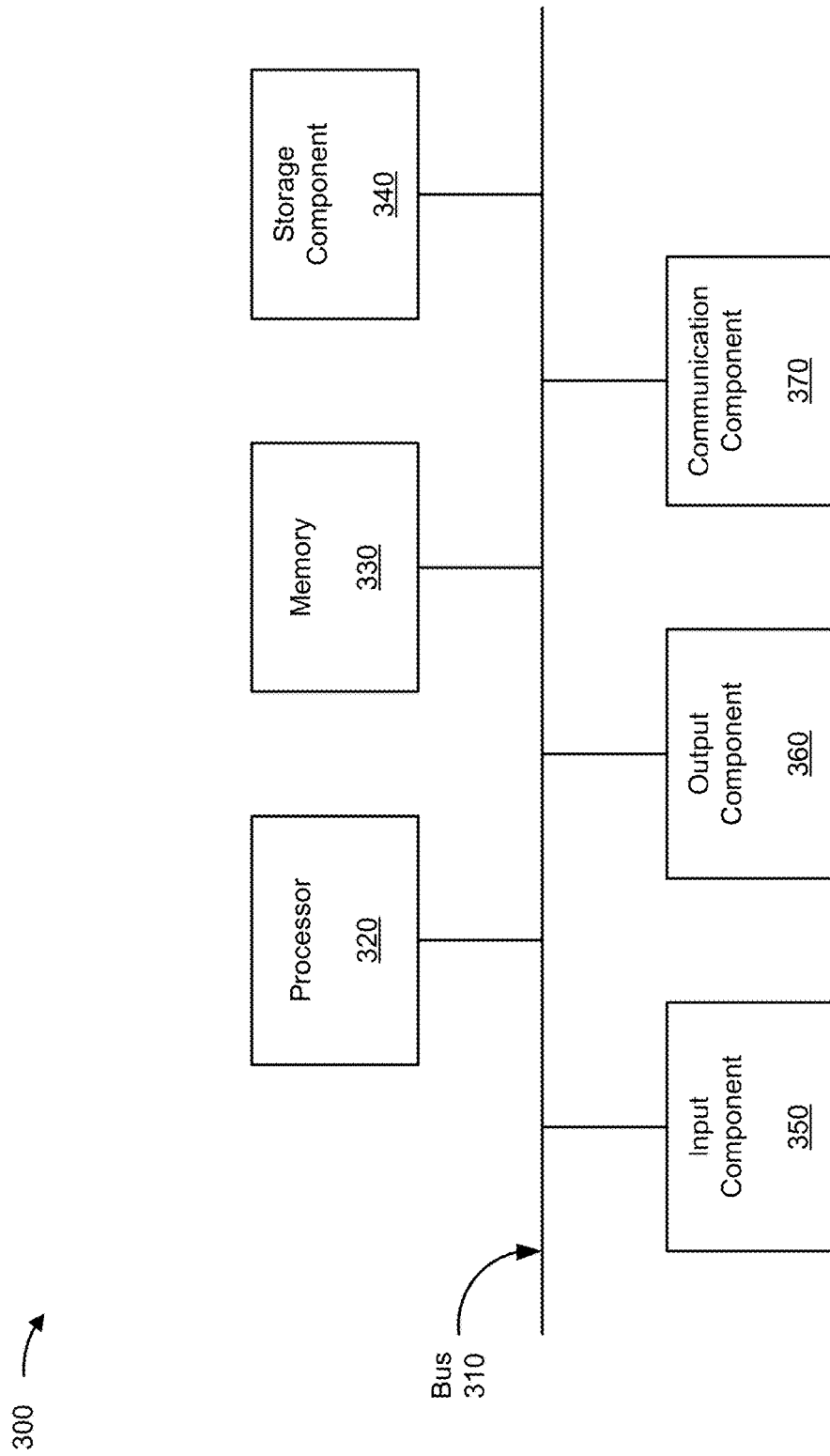
FIG. 3 is a diagram of example components of one or more devices of FIG. 2.

FIG. 3 is a diagram of example components of a device 300, which may correspond to server device 210, computing device 220, and/or mobile device 230. In some implementations, server device 210, computing device 220, and/or mobile device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The quantity and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
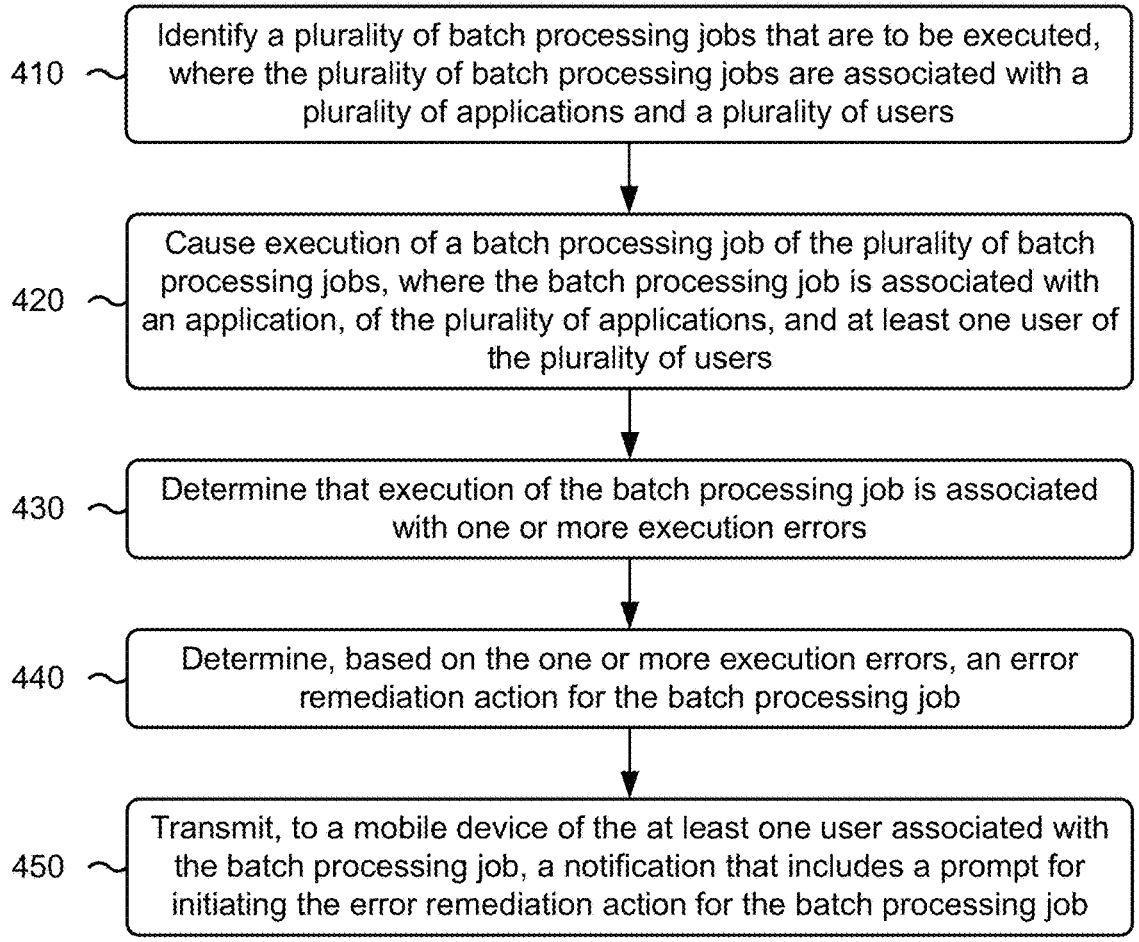
FIG. 4 is a flowchart of an example process relating to batch processing management.

FIG. 4 is a flowchart of an example process 400 associated with batch processing management. In some implementations, one or more process blocks of FIG. 4 may be performed by a server device (e.g., server device 210, which may implement a batch processing platform). In some implementations, one or more process blocks of FIG. 4 may be performed by another device or a group of devices separate from or including the server device, such as a computing device (e.g., computing device 220) and/or a mobile device (e.g., mobile device 230). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include identifying a plurality of batch processing jobs that are to be executed, where the plurality of batch processing jobs are associated with a plurality of applications and a plurality of users (block 410). As further shown in FIG. 4, process 400 may include causing execution of a batch processing job of the plurality of batch processing jobs, where the batch processing job is associated with an application, of the plurality of applications, and at least one user of the plurality of users (block 420). As further shown in FIG. 4, process 400 may include determining that execution of the batch processing job is associated with one or more execution errors (block 430). As further shown in FIG. 4, process 400 may include determining, based on the one or more execution errors, an error remediation action for the batch processing job (block 440). As further shown in FIG. 4, process 400 may include transmitting, to a mobile device of the at least one user associated with the batch processing job, a notification that includes a prompt for initiating the error remediation action for the batch processing job (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for batch processing, the system comprising:
one or more memories; and
one or more processors, coupled to the one or more memories, configured to:
 identify a plurality of batch processing jobs that are to be executed via a plurality of applications,
  wherein the plurality of applications are configured to perform the plurality of batch processing jobs, and
  wherein the plurality of batch processing jobs are associated with a plurality of users, the plurality of batch processing jobs including a batch processing job associated with at least one user of the plurality of users;
 cause execution of the batch processing job,
  wherein the batch processing job is associated with an application, of the plurality of applications, configured to perform the batch processing job;
 determine that the execution of the batch processing job is associated with one or more execution errors;
 identify a mobile device corresponding to the at least one user associated with the batch processing job;
 transmit, to the mobile device of the at least one user associated with the batch processing job and based on determining that the execution of the batch processing job is associated with the one or more execution errors, a notification that includes a prompt for generating a support request for the batch processing job to request support for remediating the one or more execution errors associated with the batch processing job;
 receive, by the system, a plurality of instructions to generate the support request for the batch processing job based on activation of the prompt;
 determine the plurality of instructions include conflicting instructions comprising a first instruction that conflicts with a second instruction, apply one or more rules to resolve the conflicting instructions, wherein the one or more rules include rejecting the first instruction in accordance with a predefined priority order corresponding to the plurality of users;
 determine, based at least in part on the second instruction, a subset of users of the plurality of users for a remediation action,
  wherein the subset of users includes the at least one user and at least one other user associated with the batch processing job,
  wherein the remediation action comprises a group communication session,
  wherein the subset of users for the group communication session is determined based on an availability associated with the subset of users, and
  wherein the availability is indicative of a capability each user of the subset of users has to participate in the group communication session based on factors including location of each user of the subset of users and current local time of each user of the subset of users;
 execute one or more operations of a runbook in response to the one or more execution errors associated with the batch processing job, wherein the one or more operations of the runbook, when executed, are configured to perform the remediation action, including generating the group communication session;
 transmit information relating to the group communication session to a plurality of devices,
  wherein the plurality of devices correspond to the subset of users, and
  wherein the information includes a link to access the group communication session; and
 receive an indication that the one or more execution errors are resolved or the remediation action was executed.

2. The system of claim 1, wherein the one or more execution errors include one or more of:
 an error caused by the batch processing job failing to execute;
 an error caused by an operation, upon which the batch processing job depends, failing to execute;
 an error caused by another batch processing job, upon which the batch processing job depends, failing to execute;
 an error generating an output of the batch processing job;
 an error performing an operation of the batch processing job;
 an error caused by the batch processing job beginning later than a scheduled start time for the batch processing job;
 an error caused by the batch processing job continuing past a scheduled end time for the batch processing job; or
 an error caused by execution of the batch processing job exceeding a time allotment for the batch processing job.

3. The system of claim 1, wherein the one or more processors are further configured to:
 generate the group communication session for the subset of users.

4. The system of claim 1, wherein the one or more processors are further configured to:
 receive information that identifies a configuration for a particular batch processing job of the plurality of batch processing jobs,
  wherein the configuration identifies a set of parameters for the particular batch processing job and a set of users associated with the particular batch processing job.

5. The system of claim 1, wherein the one or more processors, when causing execution of the batch processing job, are configured to:
 command one or more operations of the application via an application programming interface of the application.

6. The system of claim 1, wherein the one or more processors, when generating the support request for the batch processing job, are configured to:
command one or more operations of a different application via an application programming interface of the different application.

7. A method for batch processing, comprising:
identifying a plurality of batch processing jobs that are to be executed,
wherein the plurality of batch processing jobs are associated with a plurality of applications and a plurality of users, the plurality of batch processing jobs to be executed across the plurality of applications or the plurality of users;
causing execution of a batch processing job of the plurality of batch processing jobs,
wherein the batch processing job is associated with an application, of the plurality of applications, and at least one user of the plurality of users;
determining that the execution of the batch processing job is associated with one or more execution errors;
determining, based on the one or more execution errors, an error remediation action for the batch processing job,
wherein the error remediation action comprises a group communication session,
wherein a subset of users of the plurality of users for the group communication session is determined based on an availability associated with the subset of users,
wherein the subset of users includes:
the at least one user, and
at least one other user associated with the batch processing job, and
wherein the availability is indicative of a capability each user of the subset of users has to participate in the group communication session based on factors including location of each user of the subset of users and current local time of each user of the subset of users;
identifying a mobile device corresponding to the at least one user associated with the batch processing job;
transmitting, to the mobile device of the at least one user associated with the batch processing job, a notification that includes a prompt for initiating the error remediation action for the batch processing job;
receiving a plurality of instructions to initiate the error remediation action for the batch processing job based on activation of the prompt;
determining the plurality of instructions include conflicting instructions comprising a first instruction corresponding to the mobile device that conflicts with a second instruction corresponding to at least one other mobile device associated with the at least one other user of the subset of users;
applying one or more rules to resolve the conflicting instructions, wherein the one or more rules include rejecting the second instruction in accordance with a predefined priority order of the plurality of users;
transmitting, to the mobile device of the at least one user and the at least one other mobile device, information relating to the group communication session,
wherein the information includes a link to access the group communication session;
causing, based at least in part on the first instruction, initiation of the error remediation action for the batch processing job; and executing one or more operations of a runbook in response to the one or more execution errors associated with the batch processing job,
wherein the one or more operations of the runbook, when executed, are configured to perform the error remediation action, including generating the group communication session.

8. The method of claim 7, wherein the error remediation action further includes one or more of:
generating a support request;
terminating the batch processing job;
executing another batch processing job; or
re-executing the batch processing job.

9. The method of claim 7, wherein one or more different error remediation actions, based on the one or more execution errors, are automatically initiated.

10. The method of claim 7, wherein the at least one user is a secondary user associated with the batch processing job, and
wherein the method further comprises:
determining that another mobile device of a primary user associated with the batch processing job is in a different location from an established location of the primary user; and
determining to transmit the notification to the mobile device of the secondary user based on determining that the other mobile device is in the different location.

11. The method of claim 7, wherein the at least one user is a secondary user associated with the batch processing job, and
wherein the method further comprises:
determining that a primary user associated with the batch processing job is associated with a current local time that is outside of a notification time window; and
determining to transmit the notification to the mobile device of the secondary user based on determining that the current local time is outside of the notification time window.

12. The method of claim 7, wherein causing execution of the batch processing job comprises:
commanding one or more operations of the application via an application programming interface of the application.

13. The method of claim 7, wherein causing the initiation of the error remediation action comprises:
causing the initiation of the error remediation action based on the first instruction.

14. The method of claim 13, wherein causing initiation of the error remediation action for the batch processing job comprises:
commanding one or more operations of a different application via an application programming interface of the different application.

15. A non-transitory computer-readable medium storing a set of instructions, the set of instructions comprising:
one or more instructions that, when executed by one or more processors of a device, cause the device to:
identify a plurality of batch processing jobs to be executed, the plurality of batch processing jobs associated with a plurality of users;
cause execution of a batch processing job of the plurality of batch processing jobs,
wherein the batch processing job is associated with an application, wherein the application is configured to perform the batch processing job, and
wherein the batch processing job is associated with at least one user of the plurality of users;
determine that the execution of the batch processing job is associated with one or more execution errors;
receive a plurality of instructions from the plurality of users corresponding to the one or more execution errors for remediating the one or more execution errors associated with the batch processing job;
resolve conflicting instructions of the plurality of instructions using a set of priority rules corresponding to the plurality of users, wherein resolving the conflicting instructions includes rejecting at least one conflicting instruction of the conflicting instructions in accordance with the set of priority rules;
determine, based on the one or more execution errors and the set of priority rules, an error remediation action for the batch processing job,
wherein the error remediation action comprises a group communication session, and
wherein a subset of users of the plurality of users for the group communication session is determined based on an availability associated with the subset of users,
wherein the subset of users includes:
the at least one user, and
at least one other user associated with the batch processing job,
wherein the availability is indicative of a capability each user of the subset of users has to participate in the group communication session based on factors including location of each user of the subset of users and current local time of each user of the subset of users;
execute one or more operations of a runbook in response to the one or more execution errors associated with the batch processing job using a remaining instruction, of the conflicting instructions, that was not rejected based on the set of priority rules,
wherein the one or more operations of the runbook, when executed, are configured to perform the error remediation action, including generating the group communication session;

transmit, to a plurality of devices, information relating to the group communication session,
wherein the plurality of devices correspond to the subset of users, and
wherein the information includes a link to access the group communication session; and
cause performance of the error remediation action for the batch processing job.

16. The non-transitory computer-readable medium of claim 15, wherein the one or more instructions further cause the device to:
transmit, to a mobile device of the at least one user associated with the batch processing job, a notification that includes a prompt for initiating the error remediation action for the batch processing job; and
receive an instruction from the mobile device to initiate the error remediation action for the batch processing job based on activation of the prompt, wherein the performance of the error remediation action for the batch processing job is caused based on the instruction.

17. The non-transitory computer-readable medium of claim 15, wherein the performance of the error remediation action for the batch processing job is caused automatically.

18. The non-transitory computer-readable medium of claim 15, wherein the error remediation action further includes one or more of:
generating a support request;
terminating the batch processing job;
executing another batch processing job; or
re-executing the batch processing job.

19. The non-transitory computer-readable medium of claim 15, wherein the one or more instructions further cause the device to:
cause respective mobile devices of the subset of users to connect to the group communication session.

20. The non-transitory computer-readable medium of claim 15, wherein the one or more instructions, that cause the device to cause execution of the batch processing job, cause the device to:
command one or more operations of the application via an application programming interface of the application.

* * * * *